No. 645,477. Patented Mar. 13, 1900.
F. M. LEE & E. R. TURNER.
KINETOGRAPHIC CAMERA.
(Application filed Oct. 14, 1899.)
(No Model.)
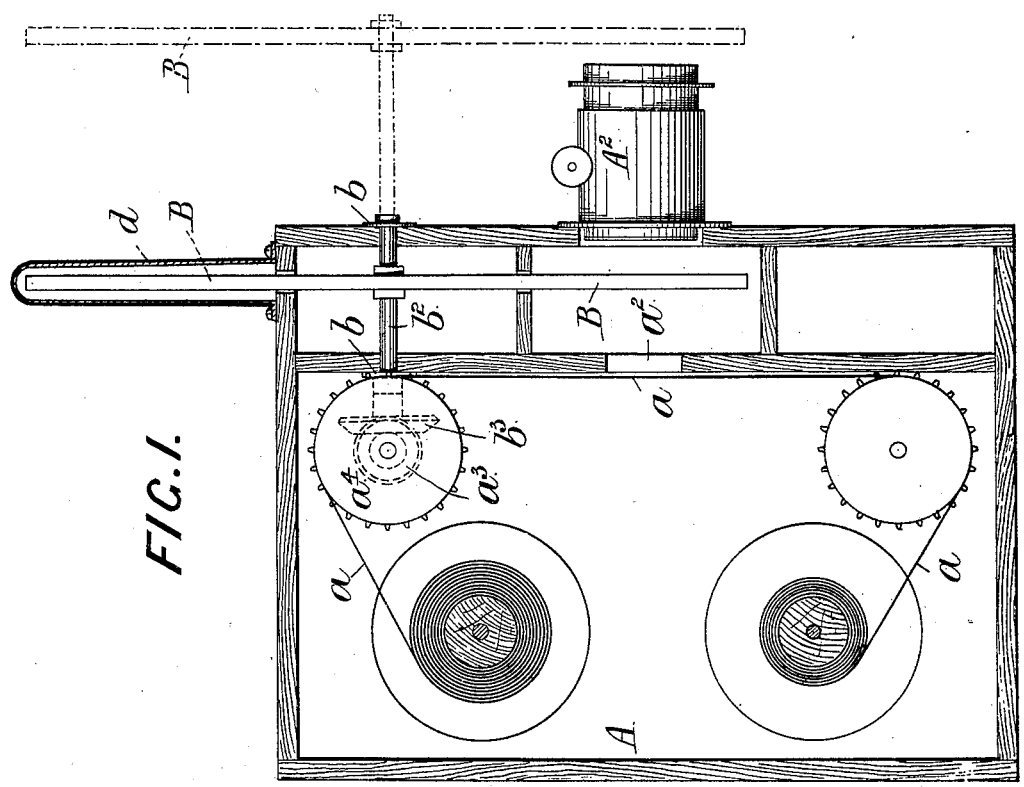
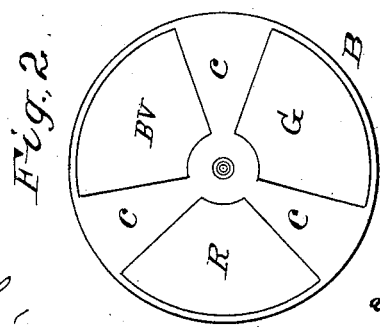

UNITED STATES PATENT OFFICE.

FREDERICK MARSHALL LEE, OF WALTON-UPON-THAMES, AND EDWARD RAYMOND TURNER, OF LONDON, ENGLAND.

KINETOGRAPHIC CAMERA.

SPECIFICATION forming part of Letters Patent No. 645,477, dated March 13, 1900.

Application filed October 14, 1899. Serial No. 733,671. (No model.)

*To all whom it may concern:*

Be it known that we, FREDERICK MARSHALL LEE, a resident of Oakfield, Walton-upon-Thames, county of Surrey, and EDWARD RAYMOND TURNER, a resident of Lynwood, Queen's road, Hounslow, London, county of Middlesex, England, subjects of the Queen of Great Britain and Ireland, have invented certain new and useful Means for Taking Kinematographic Pictures, (for which we have applied for a patent in Great Britain, No. 6,202, dated March 22, 1899,) of which the following is a specification.

The object of our invention is to produce kinematographic pictures in such manner that they may be exhibited in the colors of the originals.

According to our invention we place between the object and the sensitized surface on which the pictures are to be taken the color-screens which are used in taking negatives for reproduction in colors, the said color-screens being mounted so that they are rapidly and in succession brought into position as each successive portion of the film is brought into position to receive the photographic picture. Positives (termed "color-records") from the negatives thus taken may be exhibited through a like moving screen, and the several pictures corresponding to the different color sensations being exhibited rapidly one after the other present to the eye an appearance in form, movement, and color resembling the original from which the photographs were taken. The positives of the various color sensations may be exhibited singly in rapid succession, or two or more of them may be superposed.

In the accompanying drawings we have illustrated arrangements according to this invention, with reference to which we will describe the manner in which the invention may be carried into practical effect; but we do not limit ourselves to these precise arrangements.

Figure 1 is a vertical section showing the apparatus for taking the negatives; and Fig. 2 is a face view, on a reduced scale, of the screen through which the negatives are taken.

Referring first to Fig. 1, A is the camera in which the kinematographic film $a$, on which the negatives are to be taken, is exposed before an opening $a^2$ behind the lens $A^2$. This may be arranged and operated in the usual manner. Mounted in bearings $b$ is a shaft $b^2$, having secured to it a bevel gear-wheel $b^3$, gearing with a bevel gear-wheel $a^3$ on the axis of the sprocket-wheel $a^4$, which is one of the ordinary sprocket-wheels by which the film $a$ is moved. The shaft $b^2$ has secured to it the color-screen B, (shown separately in Fig. 2,) provided with the three colored glasses—viz., a red glass R, a green glass G, and a blue-violet glass B V. The parts at $c$ are opaque, and by making these opaque portions greater or less in width the exposures for the several photographic negatives are regulated. The wheels $a^3$ and $b^3$, Fig. 1, are so proportioned that a glass of the color-screen is brought into position by the rotation of the disk B each time a fresh portion of the film is exposed at the opening $a^2$—that is, the disk B is rotated once for each three portions of film exposed, the opaque portions $c$ shutting off the light as the margins of the color-records pass the aperture $a^2$. The upper part of the disk B is shown as being inclosed in a light-excluding hood $d$, or other provision may be made for the exclusion of light. In place of arranging the screen B inside the camera between the opening $a^2$ and the lens $A^2$, as shown, it may be arranged outside the lens, as shown in dotted lines.

In exhibiting positives made from negatives taken in an apparatus such as above set forth the light passing through a view on the film should also be made to pass through a glass screen of the same color as the screen through which the light passed in the production of the negative.

In referring to the screen hereinbefore and in the claims we of course include in the expression "glass" any material sufficiently transparent for the purpose.

Having now particularly described and ascertained the nature of this invention and in what manner the same is to be performed, we declare that what we claim is—

1. In a camera for taking kinematographic negatives a color screen or shutter placed between the object and the sensitized surface and carrying a plurality of colored glasses of the primary colors respectively, and means for moving the screen or shutter synchronously with the movements of the sensitized surface.

2. In a camera for taking kinematographic negatives, a color screen or shutter placed between the object and the sensitized surface, and consisting of a disk carrying a plurality of glasses of the primary colors respectively, and mounted upon an axis, and gearing for rotating the said disk synchronously with the movements of the sensitized surface.

In testimony whereof we have signed this specification in the presence of two subscribing witnesses.

FREDERICK MARSHALL LEE.
EDWARD RAYMOND TURNER.

Witnesses:
ALFRED NUTTING,
FREDK. L. RAND.